United States Patent
Kawamura

[11] Patent Number: 6,137,055
[45] Date of Patent: Oct. 24, 2000

[54] CORRUGATED TUBE AND AN AUTOMATIC WIRE-LOADING DEVICE THEREFOR

[75] Inventor: Shigeto Kawamura, Yokkaichi, Japan

[73] Assignee: Sumitomo Wiring Systems, Ltd., Yokkaichi, Japan

[21] Appl. No.: 09/383,411

[22] Filed: Aug. 26, 1999

Related U.S. Application Data

[63] Continuation of application No. 08/922,352, Sep. 3, 1997, Pat. No. 6,034,329.

[30]     Foreign Application Priority Data

Sep. 3, 1996 [JP] Japan .................................. 8-232783
Oct. 16, 1996 [JP] Japan .................................. 8-273442

[51] Int. Cl.$^7$ ................................................ H02G 3/04
[52] U.S. Cl. ..................................... 174/68.3; 174/102 D; 138/166
[58] Field of Search ..................... 174/113 AS, 102 R, 174/102 D, 68.3, 136, 162, 102 E, 102 SP; 138/166, 167

[56]           References Cited

U.S. PATENT DOCUMENTS 4,422,478 12/1983 Pentney et al. ...................... 138/168
4,513,787 4/1985 Hegler et al. ........................ 138/166

*Primary Examiner*—Kristine Kincaid
*Assistant Examiner*—William H. Mayo, III
*Attorney, Agent, or Firm*—Greenblum & Bernstein, P.L.C.

[57]           ABSTRACT

A corrugated tube with a longitudinal slit is loaded with electrical wires and the slit is locked. This process is effected using one device and in a single step. The corrugated tube is provided on its outer surface with circular peaks and troughs alternating along the axial direction. The portions facing one another across the slit are provided with convex and concave shapes along the circumference of the tube forming female and male locking portions. The male locking portion is inserted under the female locking portion, so as to lock the slit. An automatic locking device has a tubular guiding unit having a slanted tube part, and a tubular locking unit. The wires pass through the slanted tube part and the tubular locking unit. The tubular guiding unit is inserted into the slit, and the corrugated tube inside the tubular locking unit. When the device and the corrugated tube are moved relative to each other in the longitudinal direction, the wires are transferred from the device into the corrugated tube and the slit is automatically locked.

9 Claims, 9 Drawing Sheets

CORRUGATED TUBE AND AN AUTOMATIC WIRE-LOADING DEVICE THEREFOR

This is a continuation of U.S. patent application Ser. No. 08/922,352, filed Sep. 3, 1997, now patented as U.S. Pat. No. 6,034,329, the contents of which are herein incorporated by reference in its entirety.

BACKGROUND OF THE INVENTION

1. Field of the Invention

The present invention relates to a wiring harness used in automobiles, and a device for protecting the wiring harness. More specifically, the invention concerns a corrugated tube, through which the wiring harness passes and is protected thereby. Such a corrugated tube may have a longitudinal slit along the axial direction. In this construction, the tube is first opened along the slit, a group of electrical wires is loaded through the opening, and the opening is closed. The invention also relates to a device for inserting a group of electrical wires into the corrugated tube, which can create a longitudinal slit in the corrugated tube, insert the group of wires therein, and close and lock the tube at the slit.

2. Description of Background Information

In the prior art wiring harness used in automobiles, the main portion of the harness is placed within a corrugated tube for protection. As shown in FIG. 1A, a corrugated tube 1-1 can have a longitudinal slit S along the axial direction; as shown in FIG. 1C, the slit portion can have an overlapping zone R in the axial direction. As shown in FIG. 1B, a corrugated tube 1-2 may be uniform (i.e., no slit).

In the case of the corrugated tube 1-2 without a slit, a connector housing (not shown) to be mounted on an end portion cannot pass through the corrugated tube 1-2. Therefore, the electrical wires must first be inserted through the corrugated tube 1-2, whereupon the connector housing is then mounted on the end portion of the wires as a final step. A such, the end portion of each electrical wire cannot be loaded into the connector housing by an automatic process. This prevents automating the mounting process of the wiring harness.

For the corrugated tube 1-1 with a slits, the group of electrical wires are loaded simply by opening the tube at the slit. The connector housing can thus be connected to the group of electrical wires beforehand. Accordingly, the end portion can be inserted into the connector housing by automation. However, when the corrugated tube 1-1 is bent as shown in FIG. 2, the slit S may open. It is therefore necessary to seal the slit after the electrical wires are inserted into the tube. To this end, tape can be wound around the outer circular surface of the tube 1-1. However, this tape-winding step is cumbersome, increasing manufacturing time and costs. This step is also necessary for the corrugated tube 1-2 with an overlapping slit shown in FIG. 1C.

Referring now to FIG. 3, a prior art device 3 inserts the electrical wires into the abovementioned tubes 1-1 or 1-3 with a slits. The electrical wires W are inserted initially through the device 3. Device 3 opens slit 11 and installs wires W into the corrugated tube 1 as device 3 moves down the length of the tube. In this construction, the connector housing C can be connected beforehand to the wire end portion.

However, device 3 only serves to pass the wires W into the corrugated tube, and does not otherwise obviate the need for tape.

SUMMARY OF THE INVENTION

To overcome this problem, longitudinal zones flanking the slit may be defined on the outer surface of the tube. Peak portions in those zones may be provided with corresponding female and male locking portions extending from the slit in the circumferential direction. For example, these female and male portions may use sequential concave and convex structures, viewed from the axial direction of the tube. This configuration extends from the slit side along the circumferential direction of the tube. When these male and female configurations are superposed, the tube is locked.

When such a tube is used, there is no need to close the slit with tape. However, after the wires are installed, a supplementary step of superposing the female and male locking portions must be performed.

When the locking portions are installed on all the peak portions along the entire length of the corrugated tube, locking work is rather cumbersome. Further, when the electrical wires are tightly contained in the tube, a strong outward force is exerted on the slit of the tube. A correspondingly strong force is therefore needed to superpose the female and male locking portions. Such a locking step can be extremely difficult for the assembly workers. Moreover, after the electrical wires are installed through the tube, the tube must be locked during a separate step. This procedure requires a two-step operation (i.e., installation followed by locking), increasing manufacturing time and associated costs.

To enable automation of the operation of inserting the wire end portion into the connector housing, a corrugated tube preferably has a slit. The slit may be designed such that it can be closed easily. There is therefore no need for the application of tape. Further, it is desirable to combine the loading of the electrical wires into the tube and the automatic locking of the tube thereafter into a single step.

To this end, there is provided a corrugated tube for protecting a wiring harness including of a plurality of electrical wires. The tube extends in a longitudinal direction and has an outer surface with alternating peak and trough sections formed along the longitudinal direction thereof. The tube has a longitudinal slit with two sections facing each other across the slit. Each section has a sequential concave and convex shaped cross sections extending from the slit along the circumference of the tube defining female and male locking portions, respectively. The male locking portion fits into the female locking portion, when locked, from the inside of the tube, so that the concave and convex configurations of the male locking portion are securely superposed with the corresponding concave and convex configurations of the female locking portion to close and lock the slit.

In this corrugated tube, the female locking portion is wider in the longitudinal direction of the tube that than the male locking portion.

The female locking portion may have sequential convex, concave and convex shapes forming a series of a successive L-shapes extending from the slit along the circumference of the tube. The male locking portion has sequential concave and convex shapes forming a series of successive V-shapes extending from the slit along the circumference of the tube. The plurality of electrical wires are loaded by opening the slit, and the slit is subsequently closed and locked by superposing the male and female locking portions.

There is also provided a method of automatically loading and locking a plurality of electrical wires into a corrugated tube. A device is prepared having tubular guiding unit and a tubular locking unit. The guiding unit has a top projection part, a bottom slit-opening part and a slant tube part therebetween, and first and second ends, the slant tube part being obliquely arranged from the top projection part at the first end towards the bottom slit-opening part at the second end. The locking unit has a first and a second end, and accommodates the corrugated tube and locks the female and male locking portions. The second end of the tubular guiding unit and the first end of the tubular locking unit are longitudinally connected, such that the slant tube part and the tubular locking unit are inclined relative to each other. The plurality of electrical wires are loaded into the tubular guiding and locking units. The bottom slit-opening part of the tubular guiding unit is inserted into the slit. The corrugated tube is inserted into the tubular locking unit. The tubular locking unit is moved relative to the corrugated tube, whereby the slit is opened, the electrical wires are loaded into the corrugated tube, and the female and male locking portions are locked.

There is further provided a device for loading and locking a plurality of electrical wires into the corrugated tube having an inner and an outer diameter. The device includes a tubular guide unit for guiding the plurality of electrical wires. The unit has a first and a second end. At least a slant tube part obliquely extends from the first end towards the second end. The slant tube part has an external diameter smaller than the internal diameter of the corrugated tube. A tubular locking unit has a first and a second end to lock the slit. The unit has an inner circular surface along a longitudinal direction and a gradually decreasing inner diameter from the first end towards the second end along the longitudinal direction. The diameter at the second end is equal to the external diameter of the corrugated tube when it is locked. The tubular locking unit can accommodate the corrugated tube and lock the female and male locking portions. The second end of the tubular guiding unit and the first end of the tubular locking unit are longitudinally connected, such that the slant tube part and the tubular locking unit are inclined with respect to each other. In use, the unit accommodates the plurality of electrical wires. When the when the slit-opening part is inserted into the slit, the tubular locking unit contains the corrugated tube and such that when there is a relative movement between the tubular guiding unit and the corrugated tube, the plurality of electrical wires are transferred into the corrugated tube, the female and male locking portions are gradually brought closer together towards the second end of the tubular locking unit, and the slit is locked.

In the above device, the tubular guiding unit may further comprise a slit-opening part having a substantially round cross-section at the first end of the tubular guiding unit. The slit-opening part gradually fuses with the slant tube part towards the second end thereof. When there is a relative motion between the slit-opening part and the corrugated tube, the slit is gradually opened and the plurality of electrical wires are loaded into the corrugated tube.

The tubular guiding unit may further include a projection along the slant tube part at a position distal to the slit-opening part. The tubular guiding unit and the tubular locking unit are connected by this projection.

The inner circular surface of the tubular locking unit may be provided with a pair of longitudinal ribs spaced from each other and adapted to mate with corresponding concave shape of the female and male locking portions. The space between the pair of ribs gradually narrows from the first end of the tubular locking unit towards the second end thereof. When the corrugated tube approaches the second end, the female and male locking portions are superposed by virtue of a force exercised by the narrowing ribs.

BRIEF DESCRIPTION OF THE FIGURES

The above and other objects, features and advantages of the invention will be made apparent from the following description of the preferred embodiments, given as a non-limiting example, with reference to the accompanying drawings, in which.

DETAILED DESCRIPTION OF THE PREFERRED EMBODIMENTS

Figure 1A:
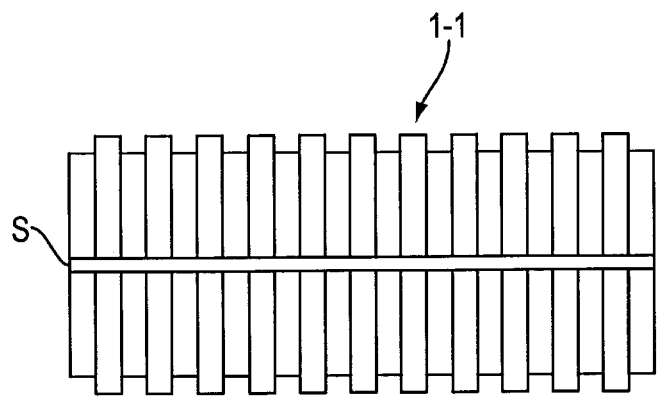
FIGS. 1A, 1B and 1C, show prior art corrugated tubes with a slit, without slit and with an overlapping zone, respectively.
Figure 1B:
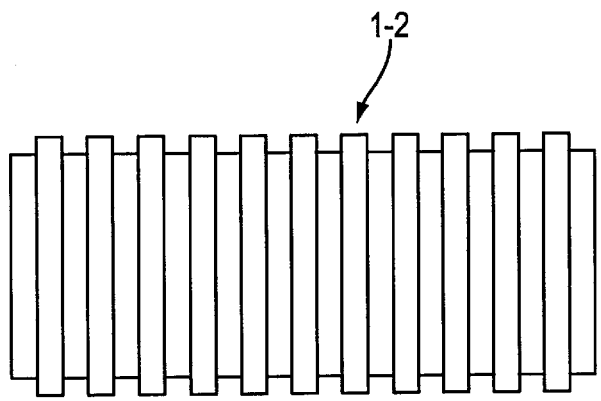
Figure 1C:
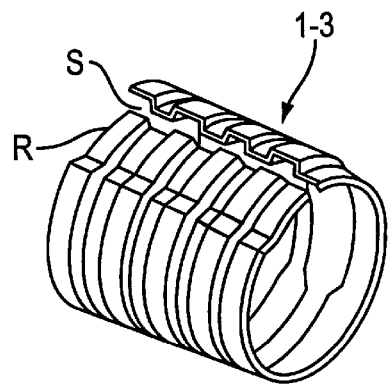
Figure 2:
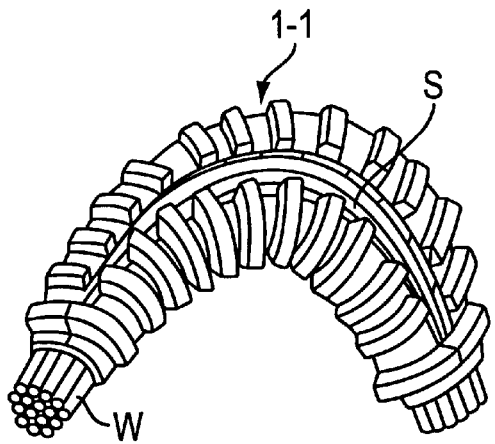
FIG. 2 schematically shows a prior art corrugated tube when the slit is deflected.
Figure 3:
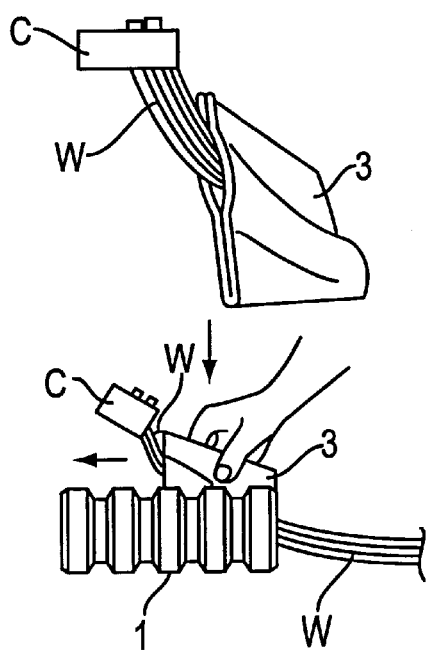
FIG. 3 shows a prior art device for loading electrical wires into a corrugated tube, and illustrates its operation.
Figure 4A:
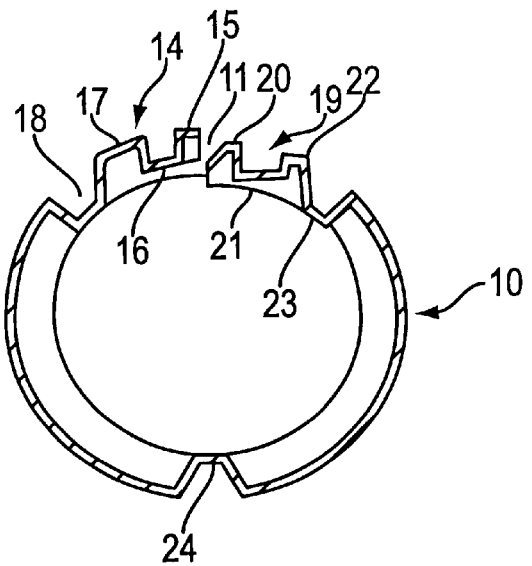
FIGS. 4A and 4B respectively show a cross-sectional view and a perspective view, the cross-section being taken through the ridge portions, of an embodiment of the corrugated tube according to the present invention.
Figure 4B:
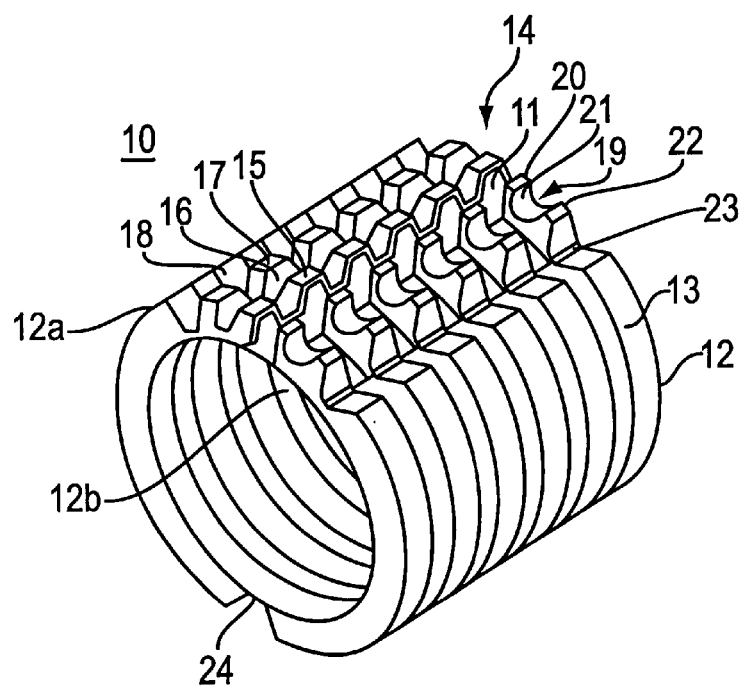

As shown in FIGS. 4A and 4B, the corrugated tube 10 according to the present invention has a plurality of circular peak sections 12 and trough sections 13 on its outer surface, alternatingly provided on tube 10 at a predetermined pitch along the axial (longitudinal) direction. Tube 10 has a longitudinal slit 11 along the longitudinal direction of the tube.

The longitudinal slit 11 forms separated first and second longitudinal zones along the slit. The first longitudinal zone defines a plurality of first peak sections 12a, while the second longitudinal zone defines a plurality of second peak sections 12b. The first and second peak sections 12a and 12b are provided with a concave and convex shapes respectively. As discussed below, these shapes are closed in single motion to lock slit 11.

The first peak section 12a makes up a female locking portion 14. Female locking portion 14 includes, sequentially from the slit 11 counterclockwise in FIG. 4, an inserting convex shape 15 having an L-shaped cross-section and an open edge, a stopper concave shape 16, a stopper convex shape 17, and a positioning concave shape 18 for defining the position during cutting (discussed below). The second peak section 12b is a male locking portion 19. Portion 19 includes, clockwise in FIG. 4, a receiving convex shape 20 preferably having a V-shaped cross-section, a stopper concave shape 21, a stopper convex shape 22, and a positioning concave shape 23 for defining the position during cutting.

Figure 6:
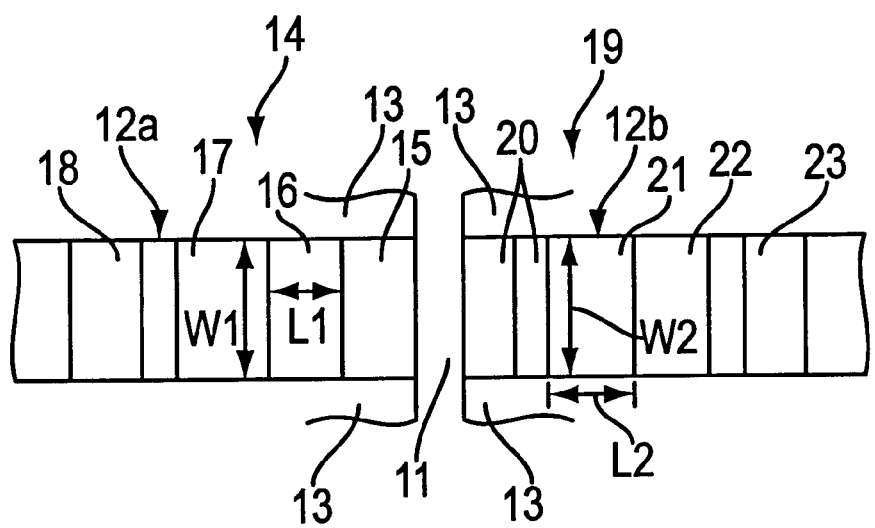
FIG. 6 shows a plan view of female and male locking portions before locking.

As shown in FIG. 6, the insertion convex shape 15, stopper concave shape 16 and stopper convex shape 17 of the female locking portion 14 have a width W1 along the longitudinal direction, which is wider than the width W2 of the corresponding shapes 20, 21, and 22 of the male locking portion 19 (i.e., W1>W2). Thus, the male locking portion 19 easily fits under the female locking portion 14 (viewed from the tube axis).

Also, the corrugated tube 10 is provided with a longitudinal notch 24 having a roughly inverted V-shaped cross-section. Notch 24 extends longitudinally along tube 11 at a position distal to slit 11. Further, the stopper concave shape 16 of the female locking portion 14 has a length L1 around the circumference of tube 10, which is shorter than the length L2 of the corresponding stopper concave shape 21 of the male locking portion 19 (i.e., L1<L2).

Figure 7A:
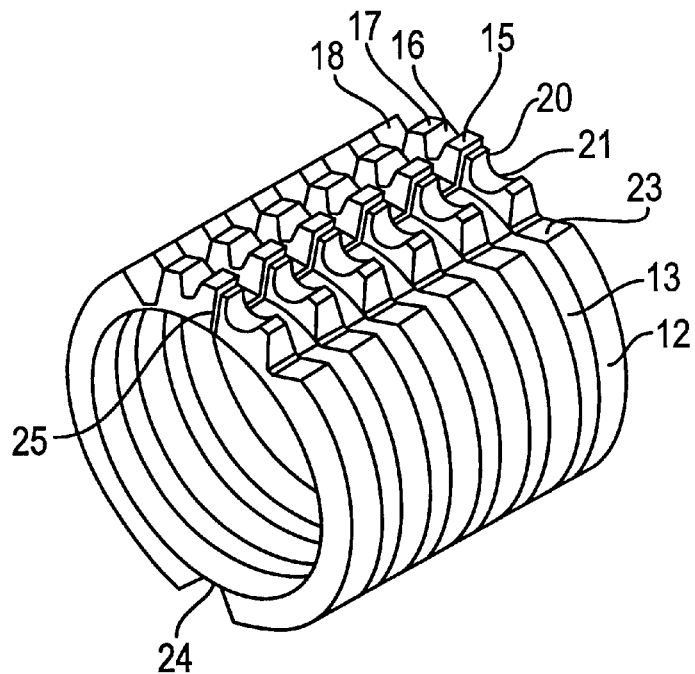
FIGS. 7A and 7B, show a perspective view of a preliminary formed corrugated tube and a cross-sectional view thereof when forming the slit in a container, respectively.
Figure 7B:
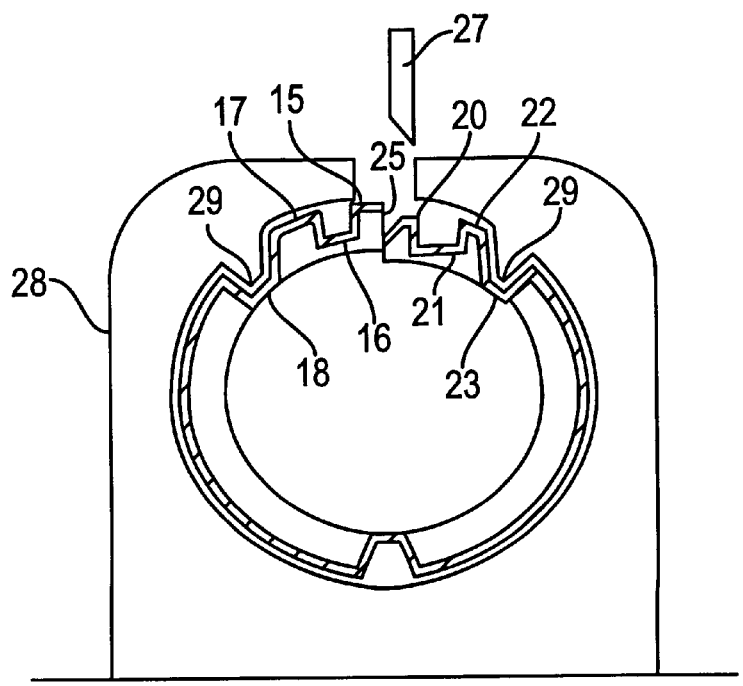

As shown in FIGS. 7A and 7B, the corrugated tube 10 is initially fabricated in a circular form in which the edge of the inserting convex shape 15 of the female locking portion 14 and the receiving convex shape 20 of the male locking portion 19 are integrally connected by a radially rising wall 25. The wall 25 is cut by a cutter 27 to form slit 11, i.e., female locking portion 14 and male locking portion 19 separate to define slit 11 therebetween. When cutting with the cutter 27, the tube 10 is installed in a container 28 having a pair of holding ribs 29 which engage concave shapes 18 and 23 respectively, so that the tube 10 is held in the appropriate position.

Figure 8A:
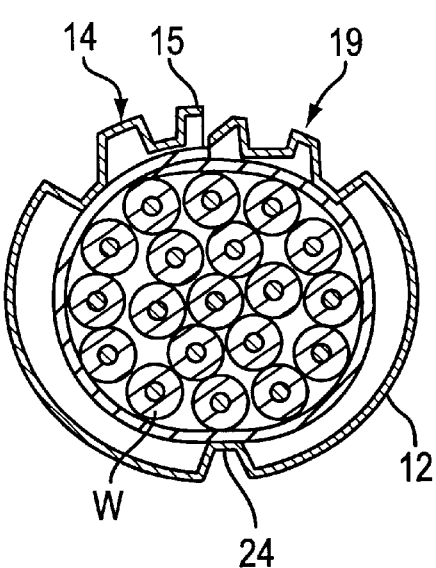
FIGS. 8A and 8B, show a cross-sectional view of the corrugated tube when loaded with electrical wires and when locked, respectively; the cross-section being taken through the ridge portions

A connector housing (not shown in the figures) is mounted at the end of a plurality of electrical wires. In this state, as shown in FIG. 8A, the slit 11 of the corrugated tube 10 is open and the connector housing is laterally inserted thereinto through the slit.

Figure 5:
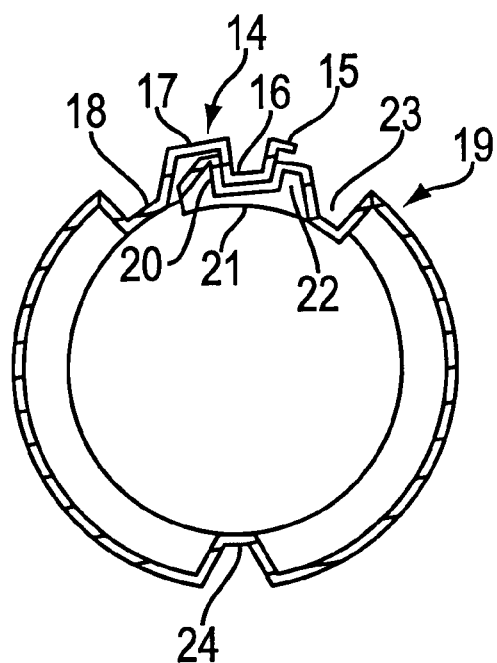
FIG. 5 shows a cross-sectional view of the corrugated tube with a slit, when the slit is closed and locked; a cross-section being taken through the ridge portions.
Figure 8B:
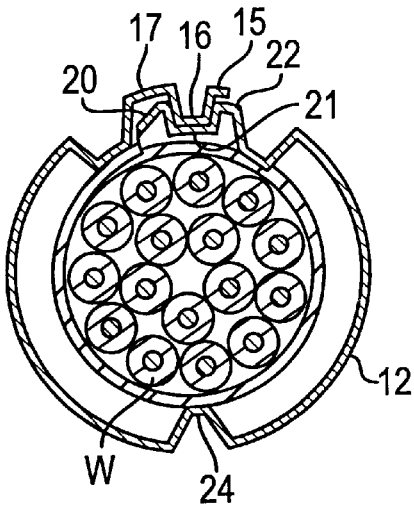

Subsequently, the female and male locking portions 14 and 19 on the opposing sides of the slit 11 are pressed together. The male locking portion 19 fits into the radially inner side of the female locking portion 14, as shown in FIGS. 5 and 8B. Notch 24 provides sufficient flexibility to permit these opposing sides of slit 11 to be brought together and locked.

In this locking process, the receiving convex shape 20 (inverted V shape in the figures) is inserted under the convex shape 15 (L form), and then moves over the stopper concave shape 16 and finally fits into the stopper convex shape 17. At the same time, the stopper concave shape 21 and convex shape 22 of the male locking portion 19 are tightly superposed on the inner side of the stopper concave shape 16 and the inserting convex shape 15 of the female locking portion 14, respectively.

As discussed above, the three sequential concave and convex formations of the male locking portion 19 engage their counterparts at the underside of the female locking portion 14. Especially, the fitted stopper concave shapes 16 and 21 are flanked by the respectively fitted stopper convex shapes. All the peak sections 12 at the sides of the slit 11 thus securely lock the female locking portion 14 and the male locking portion 19. Accordingly, it is not necessary to wrap the tube 11 in tape as required in the prior art.

However, the present invention is not limited to the aforementioned embodiments. The locking mechanism may be provided using only some of the peak sections near the slit edges, or at a predetermined pitch along the slit 11, instead of on all of the peak sections along the slit line as mentioned above.

Further, the locking mechanism is preferably provided on the peak sections of the tube, but not on the trough sections thereof. Thanks to this configuration, the flexibility of the tube is not impaired. After being loaded with a wiring harness, the tube can still be curved or bent as desired.

Moreover, only part of a circular corrugated tube is cut to define a slit between female and male locking mechanisms. Carrying into practice of the present invention is therefore very easy.

The present invention also relates to a method for loading a plurality of electrical wires W into the above-mentioned corrugated tube 10 and locking the tube. It further concerns a device specifically designed for this purpose.

Figure 9:
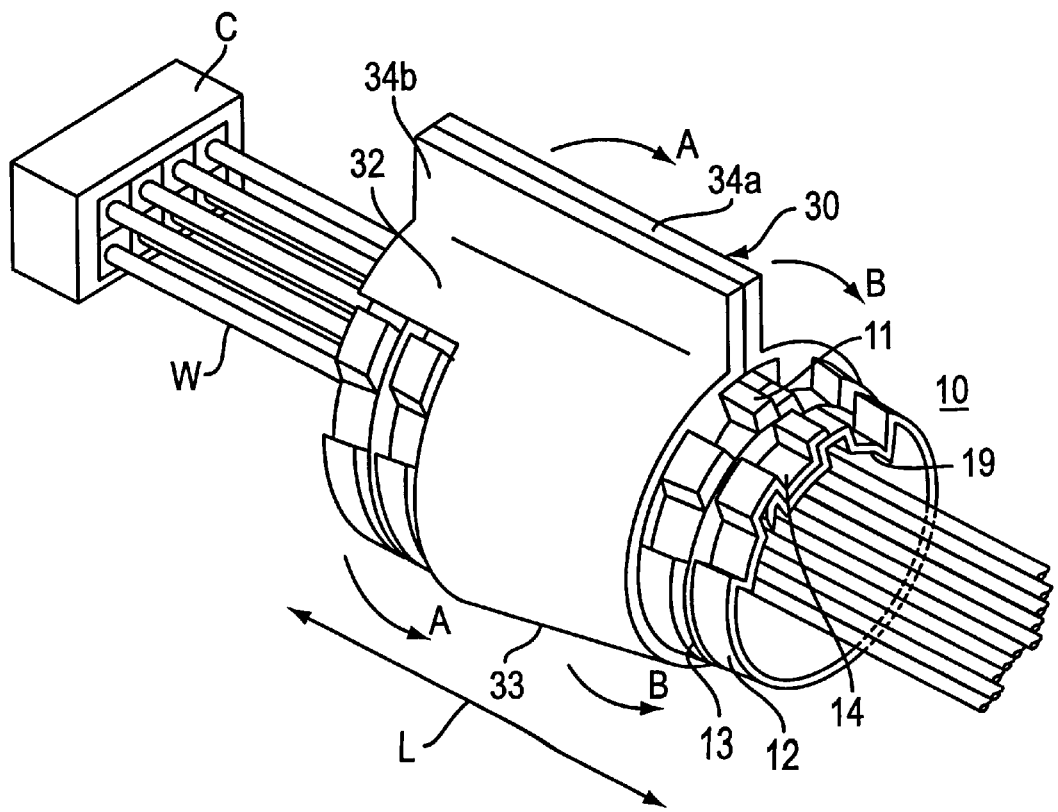
FIG. 9 illustrates a process of loading wires into the corrugated tube using the loading-and-locking device according to the invention.
Figure 10:
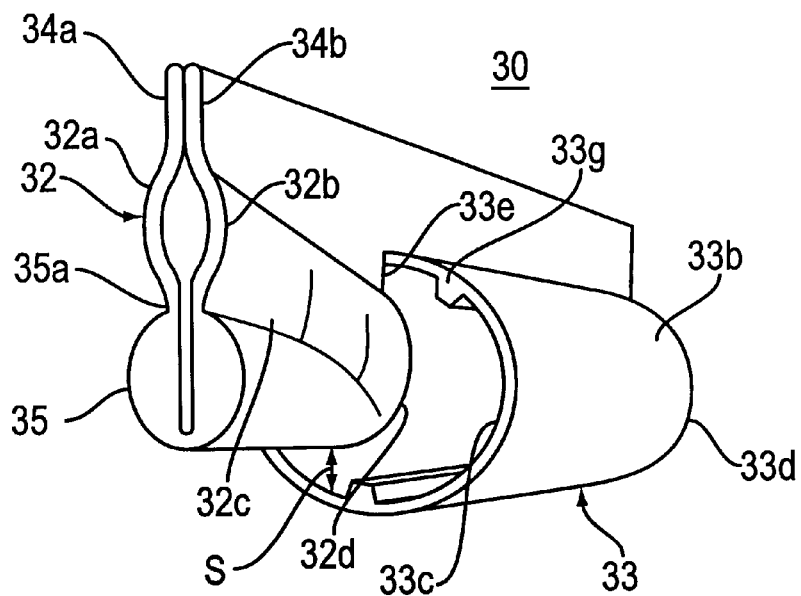
FIG. 10 shows a perspective view of the loading-and-locking device of FIG. 9.

FIG. 9 shows a corrugated tube 10 and a wire-loading device 30 by which a plurality of electrical wires are installed in the corrugated tube, where the slit of the tube is closed and locked.

The shape of wire-loading device 30 is shown in FIGS. 9–13. A tubular guiding unit 32 for guiding the electrical wires includes at least left and right wing parts (slant tube part) 32a and 32b integrally linked at the underside of each wing. Guiding unit 32 connects with a tubular locking unit 33 at a predetermined angle of inclination. The two units can be formed integrally from a resin. Tubular locking unit 33 has a left hand and a right wing 33a and 33b integrally linked at the underside of each wing. The wings of both units 32 and 33 extend upwardly to form a projection having opposed portions 34a and 34b. Thus, the projection extends continuously from the tubular guiding unit 32 to the tubular locking unit 33. The units 32 and 33 are opened by separating the opposed portions 34a, 34b, so that the electrical wires W can be installed in units 32 and 33.

Wings 32a and 32b of the tubular guiding unit 32 have an external diameter R1 smaller than the internal diameter of the corrugated tube 10. The tubular guiding unit 32 may also be provided with a slit-fitting part 35 for opening the slit 11 of the corrugated tube 10. The slit-fitting part 35 is provided under wings 32a and 32b and extends vertically forward of device 30.

This slit-fitting part 35 is formed by linking a semicircular shaped cross section to each of the wings 32a and 32b through a neck part 35a. When both wings 32a and 32b are pressed against each other, the slit-fitting part 35 has a round cross-section. The shape of the slit-fitting part 35 gradually merges into wings 32a and 32b moving from the front of guiding unit 32 to the rear, ending in a substantially circular rear opening 32d.

Wings 32a and 32b of the tubular guiding unit 32 are integrally formed with the left and right wings 33a and 33b of the tubular locking unit 33 at the top ends thereof, respectively, so that rear opening 32d of the tubular guiding unit 32 faces the front opening 33c of the tubular locking unit 33. A space S formed between the bottom-side outer surface of the tubular guiding unit 32 and the bottom-side inner surface of the tubular locking unit 33 corresponds to the thickness of the corrugated tube 10.

The tubular locking unit 33 has a gradually narrowing diameter along its axis, from the forward end towards the rear thereof. The narrow end 33d has an inner diameter equal to the outer diameter of the corrugated tube 10 when it is locked.

Figure 11:
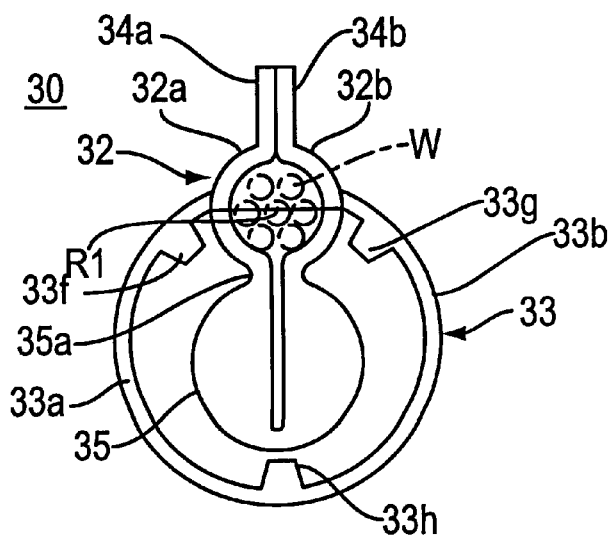
FIG. 11 shows a cross-sectional view of the loading-and-locking device of FIG. 9.
Figure 12:
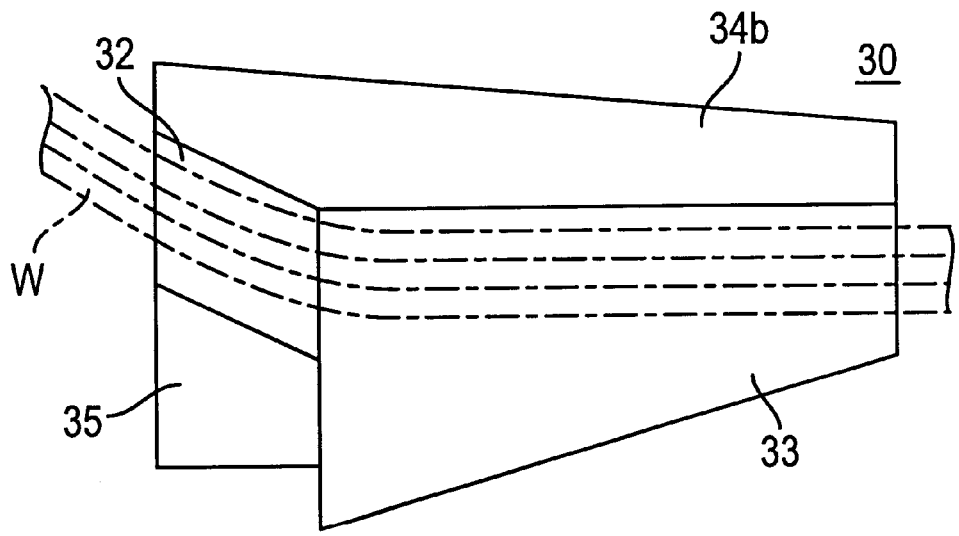
FIG. 12 shows a schematic side view of the loading-and-locking device of FIG. 9.
Figure 13:
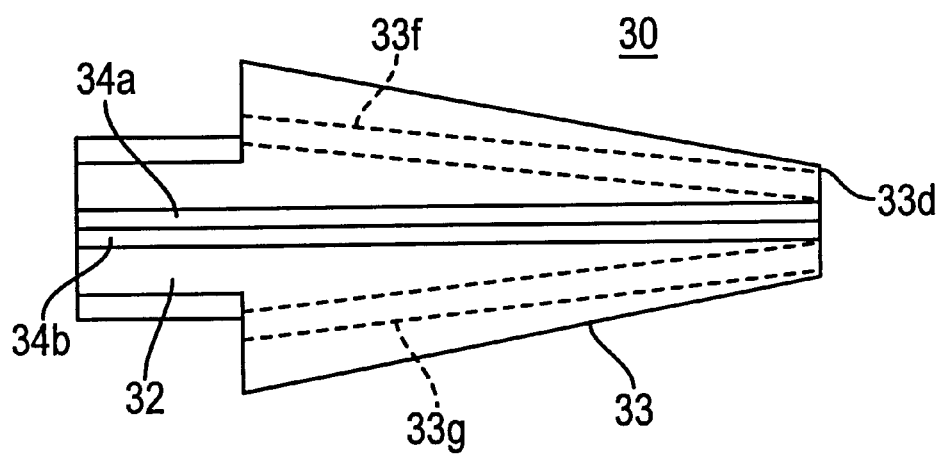
FIG. 13 shows a schematic plan of the loading-and-locking device of FIG. 9.

The inner circular surface of the tubular locking unit 33 is provided with a pair of ribs 33f and 33g at both sides of the upper opening 33e thereof. The pair of ribs 33f and 33g mate with the concave shapes 18 and 23 of the female and male locking portions 14 and 19 of the tube 10. Ribs 33f and 33g extend along the axial direction of unit 33. The distance D between ribs 33f and 33g gradually narrows towards an end 33d of the tubular locking unit 33. At the rear end 33d of tubular locking until 33, distance D is small enough such that female locking portion 14 mates with male locking portion 19. Further, as shown in FIG. 11, the inner surface of the tubular locking unit 33 is provided with a rib 33h at its bottom, which slidably mates with notch 24 in the corrugated tube 10.

By using the above device, the electrical wires W are loaded into the corrugated tube 10, and the slit locked, as follows.

The opposed portions 34a and 34b of the projection of the device 30 are opened. The wires are loaded through the tubular guiding unit 32 to the tubular locking unit 33, as shown by the dotted lines in FIGS. 11–13. In this state, the wires pass from the opening 32d of the slant tube part 32 through the guide-side opening 33c of the tubular locking unit 33.

The corrugated tube 10 is then held with the slit 11 facing upwards. The neck 35a linking the tubular guiding unit 32 and the slit-fitting part 35 is then inserted into slit 11.

Thus, the slit-fitting part 35 is fitted into the corrugated tube 10.

Thereafter, as device 30 moves along corrugated tube 10, the shape of outer circular surface of the slit-fitting part 35 forces slit 11 gradually open wider and wider. When the edge of the corrugated tube 10 is advanced into the guiding-side opening 33c of the tubular locking unit 33, the bottom part of the corrugated tube 10 is inserted into the space S formed between the tubular guiding unit 32 and the inner surface of the tubular locking unit 33. The corrugated tube 10 is thus guided into the tubular locking unit 33.

Figure 14A:
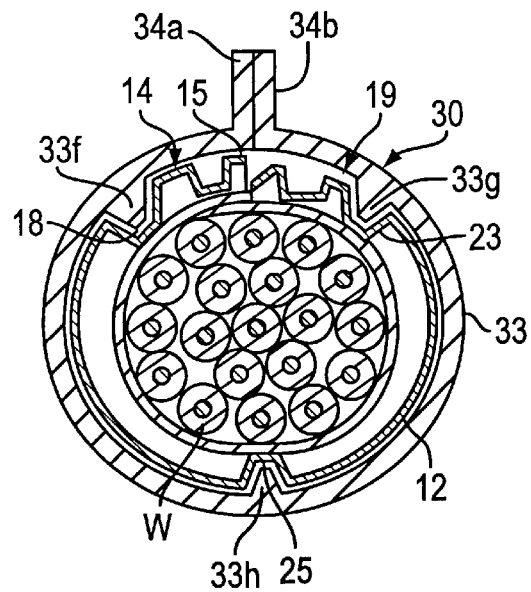
FIGS. 14A and 14B, show cross sections along the lines A—A and B—B, respectively, of FIG. 9; the cross-sections being taken through ridge portions and a member around the wires

When notch 24 of the tube 10 engages with the rib 33h of the tubular locking unit 33, the pair of ribs 33f and 33g on the tubular locking unit 33 engage concave shapes 18 and 23 provided at the upper part of the tube 10, as shown in FIG. 14A.

When the corrugated tube 10 is inserted along the inner circular surface of the tubular locking unit 33, the electrical wires contained in the tubular guiding and locking units 32 and 33 are inserted into the corrugated tube 10, as shown in FIG. 14A. Namely, the electrical wires contained in the tubular locking unit 33 automatically transfer into the corrugated tube 10 as locking unit 33 moves along tube 10.

Figure 14B:
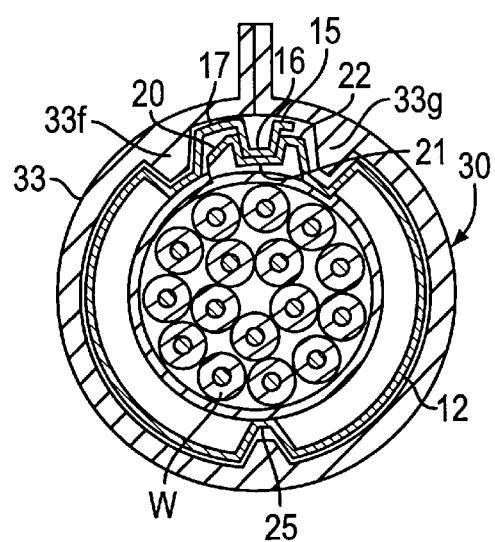

As the corrugated tube 10 advances relative to the tubular locking unit 33 towards its end 33d, the distance between the ribs 33f and 33g narrows. The concave shapes 18 and 23 engaged with these ribs are brought closer together. As shown in FIG. 14B, when the tube 10 arrives at the edge 33d of the tubular locking unit 33, the female and male locking portions 14 and 19 of the tube 10 completely superpose, closing slit 11.

Accordingly, when the corrugated tube 10 exits from the edge 33d of the device 30, the wires are loaded in the tube 10 and the slit 11 is locked.

Although, in the above-description, the corrugated tube 10 is moved vis-a-vis the device 30, it can be done inversely to obtain the same result and/or both items can be moved simultaneously.

Figure 15:
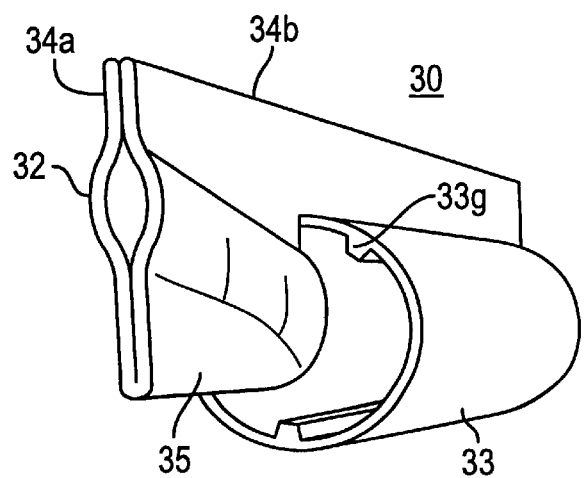
FIG. 15 shows a variant type of the loading-and-locking device according to the present invention.

FIG. 15 shows a variant type of the device 30, wherein the slit-fitting part 35' provided at the bottom part of the tubular guiding unit 32 has a flat shape. This part 35' is formed by flatly bending the left and right wings of the tubular guiding unit 32, at the position located under (in FIG. 15) the wings 32a and 32b. In this configuration, the slit-fitting part 35' is inserted into the slit 11 of the tube 10. The tube 10 or the device 30' (or both) is then moved in the longitudinal direction. The slit 11 reaches the outer circular surface 32c of the wings 32a and 32b, automatically widening slit 11. The other functions are the same as in the aforementioned embodiment.

The bottom part of the tubular guiding unit 32 may be formed so as not to include a slit-fitting part. In such a case, the slit 11 of the corrugated tube 10 is directly opened along the bottom outer surface of the guiding unit 32. When the slit 11 is opened, the corrugated tube 10 is inserted into the tubular locking unit 33 and fitted therewith. Then, the electrical wires W are loaded in the tube 10 and the slit 11 is locked.

By using the device 30 according to the invention, it is unnecessary to wrap the tube in tape. Further, the wire is installed and the slit closed in a single step, substantially reducing manufacturing time and associated costs. A worker's workload is therefore greatly reduced and the work efficiency is enhanced. Further, device 30 can be easily manufactured by molding a resin and does not raise manufacturing costs.

Although the invention has been described with reference to particular means, materials and embodiments it is to be understood that the invention is not limited to the particulars disclosed and extends to all equivalents within the scope of the claims.

The present application is related to Japanese Patent Application No. 8-232783, filed Sep. 3, 1996, and Japanese Patent Application No. 8-273442, filed Oct. 16, 1996, the disclosure of which is incorporated by reference in their entireties herein.

What is claimed:

1. A corrugated tube for protecting a wiring harness including a plurality of electrical wires, said tube comprising:

an outer surface of circular cross-section with corrugated sections alternating along a longitudinal direction in which said tube extends;

first and second sections defining a slit therebetween which extends longitudinally along said tube, said first and second sections each having a sequential concave and convex cross section adjacent said slit along a circumference of said tube;

said first and second sections forming a male corrugated locking portion and a female corrugated locking portion, respectively, said male corrugated locking portion and said female corrugated locking portion extending in the longitudinal direction of the tube and being corrugated in the longitudinal direction of the tube, said male corrugated locking portion engaging said female corrugated locking portion from the inside of said tube; and a notch formed on an opposite side of said tube to the male and female locking portions, for permitting circumferential flexion during locking, wherein said female corrugated locking portion securely superposes said male corrugated locking portion to close and lock said slit.

2. The corrugated tube according to claim 1, wherein the male and female corrugated locking portions are molded only on peak sections of the corrugated sections in the longitudinal direction of the tube, whereby the tube covering the wiring harness is bendable into a desired shape.

3. The corrugated tube according to claim 1, wherein said notch is of substantially V-shaped cross-section.

4. The corrugated tube according to claim 1, wherein said notch extends longitudinally through all of the corrugated sections of said outer surface of circular cross-section.

5. A corrugated tube for protecting a wiring harness including a plurality of electrical wires, said tube extending in a longitudinal direction, and said tube comprising:

an outer surface of circular cross-section;

first and second sections defining a slit therebetween which extends longitudinally along said tube, said first and second sections each having a sequential concave and convex cross section adjacent said slit along a circumference of said tube;

said first and second sections forming male and female locking portions, respectively, said male locking portion and said female locking portion extending in the longitudinal direction of the tube and being corrugated in the longitudinal direction of the tube; and a notch formed on an opposite side of said tube to the male and female locking portions, for permitting circumferential flexion during locking;

wherein said female locking portion securely superposes said male locking portion to close and lock said slit.

6. The corrugated tube according to claim 5, wherein said male locking portion and said female locking portion extending in the longitudinal direction of the tube are corrugated to form corrugations extending in the longitudinal direction of the tube, and wherein peak portions of said corrugations of said female locking portion are wider than mating said male locking portion in said longitudinal direction along said tube.

7. The corrugated tube according to claim 5, wherein said female locking portion has sequential convex, concave and convex shapes forming a series of successive L shapes extending from said slit along a circumference of said tube, and said male locking portion has sequential convex, concave and convex shapes forming a series of successive substantially V-shapes extending from said slit along a circumference of said tube, wherein said plurality of electrical wires are loaded by opening said slit, and said slit is closed and locked by superposing said female locking portion and said male locking portion.

8. The corrugated tube according to claim 5, wherein said male locking portion and said female locking portion extending in the longitudinal direction of the tube are corrugated to form corrugations extending in the longitudinal direction of the tube, and wherein the male and female locking portions are molded only on peak sections of the corrugations in the longitudinal direction of the tube, whereby the tube covering the wiring harness is bendable into a desired shape.

9. The corrugated tube according to claim 5, wherein said notch is of substantially V-shaped cross-section.

\* \* \* \* \*